US012433252B2

(12) United States Patent
Nye et al.

(10) Patent No.: US 12,433,252 B2
(45) Date of Patent: Oct. 7, 2025

(54) GPS TRACKER HOLDER

(71) Applicant: The Adorable Pooch Company Ltd, Frome (GB)

(72) Inventors: Bradley Nye, Frome (GB); Mikayla Nye, Frome (GB)

(73) Assignee: The Adorable Pooch Company Ltd, Frome (GB)

( * ) Notice: Subject to any disclaimer, the term of this patent is extended or adjusted under 35 U.S.C. 154(b) by 11 days.

(21) Appl. No.: 18/226,253

(22) Filed: Jul. 26, 2023

(65) Prior Publication Data

US 2025/0031668 A1  Jan. 30, 2025

(30) Foreign Application Priority Data

Aug. 5, 2022 (GB) ........................................ 2211435

(51) Int. Cl.
*A01K 11/00* (2006.01)
*A01K 27/00* (2006.01)

(52) U.S. Cl.
CPC .......... *A01K 11/008* (2013.01); *A01K 27/002* (2013.01)

(58) Field of Classification Search
CPC .. A01K 11/008; A01K 27/002; A01K 1/0263; A41D 1/04; A41D 11/00; A41D 27/205
USPC ........................................ 119/859, 792, 907
See application file for complete search history.

(56) References Cited

U.S. PATENT DOCUMENTS

| 4,644,902 A * | 2/1987 | Doyle .................... A01K 15/00 |
| | | 119/725 |
| 7,370,608 B1 | 5/2008 | Friedman |
| 2005/0217609 A1 * | 10/2005 | Dorton .................... A61D 11/00 |
| | | 119/72 |
| 2007/0107671 A1 * | 5/2007 | Goetzl .................. A01K 15/021 |
| | | 119/859 |
| 2008/0134991 A1 * | 6/2008 | DePass ................. A01K 13/006 |
| | | 119/856 |
| 2013/0014705 A1 * | 1/2013 | Cho ...................... A01K 27/006 |
| | | 119/863 |
| 2014/0299073 A1 | 10/2014 | Batista |

(Continued)

FOREIGN PATENT DOCUMENTS

DE        202010015302       1/2011

OTHER PUBLICATIONS

Ukipo, Search Report in corresponding UK application GB2211435. 9, Feb. 2, 2023.

(Continued)

*Primary Examiner* — Zoe Tam Tran
(74) *Attorney, Agent, or Firm* — Alley IP

(57) ABSTRACT

GPS trackers for pets are known, however known systems are visible, and are therefore easily identified and removed by thieves. The present invention enables a GPS tracker to be inserted within a compartment 90, wherein the compartment 90 is concealed behind a first part 10 or a second part 20 of a dog harness. Accordingly, if a dog is stolen while wearing the harness, the thief may be unaware of the presence or the location of the GPS tracker. This may enable the location of the dog to be ascertained by the owner so that the dog may be recovered. Furthermore, the unobtrusive and secure mounting of the GPS tracker within the GPS tracker holder may prevent it from becoming detached from the harness and lost.

6 Claims, 1 Drawing Sheet

(56) References Cited

U.S. PATENT DOCUMENTS

| | | |
|---|---|---|
| 2019/0021281 A1 | 1/2019 | Fultz |
| 2019/0240458 A1* | 8/2019 | Tooke .................. A41D 1/04 |
| 2019/0343082 A1 | 11/2019 | Yeboah, Jr. |
| 2019/0350169 A1* | 11/2019 | Weinrauch ........... A01K 27/006 |
| 2019/0380397 A1* | 12/2019 | Plant .................... A41D 27/205 |
| 2020/0029533 A1* | 1/2020 | Badr .................... A01K 27/008 |
| 2020/0100469 A1 | 4/2020 | Elam |
| 2021/0274754 A1* | 9/2021 | Talley .................. A01K 27/001 |
| 2022/0104460 A1* | 4/2022 | Berlin .................. A01K 27/002 |
| 2022/0167591 A1* | 6/2022 | Sullivan, II .......... A01K 27/002 |
| 2022/0240490 A1 | 8/2022 | Sporn |
| 2022/0248638 A1* | 8/2022 | McMullen ........... A01K 27/009 |
| 2022/0272947 A1* | 9/2022 | Gajo .................... A01K 27/002 |
| 2023/0069978 A1* | 3/2023 | Salyer ................. A01K 27/008 |

OTHER PUBLICATIONS

UKIPO, Examination Report in corresponding UK application GB2211435.9, Jul. 24, 2024.

The Sociable Pup, AirTag Dog Harness, 2021 (accessible from thesociablepupcompany.co.uk/products/appleairtag-trackable-dog-harness-muddy-walks).

Ruffwear, Switchbak Dog Harness, 2020 (accessible from amazon.com/RUFFWEAR-Switchbak-Harness-EverydayGranite/dp/B08R5RZQX9).

* cited by examiner

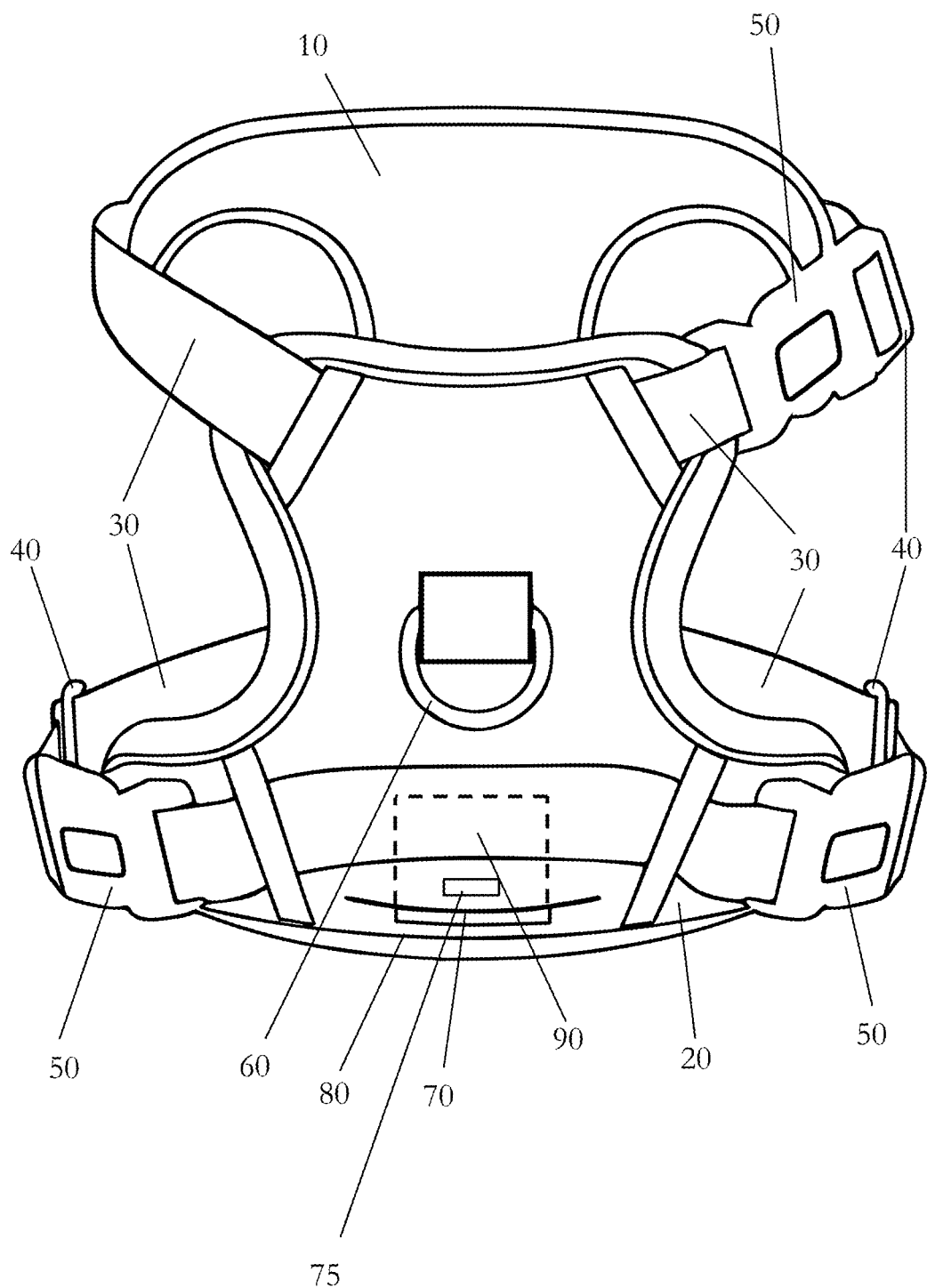

GPS TRACKER HOLDER

RELATED APPLICATIONS

This application claims benefit under 35 U.S.C. § 119 of GB Application 2211435.9, filed Aug. 5, 2022. This GB application is incorporated by reference herein in its entirety.

FIELD

The present invention relates generally to a GPS tracker holder and a method of arranging a GPS tracker on a dog and finds particular, although not exclusive, utility in concealing a GPS tracker on a dog.

BACKGROUND

The share of households owning a pet has increased significantly in recent years, not least during the COVID-19 pandemic and associated 'lockdowns', where many people were required to spend extended periods of time at home. Accordingly, consumer spending on pets and pet-related products and services has also increased, making pets, and dogs in particular, susceptible to theft. GPS trackers are known, as is their use for tracking pets. However, current GPS tracking products include bulky systems that are attachable to the pet's collar. Therefore, after a pet is stolen, the thief can merely remove the easily identifiable GPS tracker to prevent the location of the pet being tracked and the pet being recovered by its owner and/or the authorities.

SUMMARY

In a first aspect, the present invention provides a GPS tracker holder comprising: a harness for wearing by a dog, the harness comprising: a first part configured to fit adjacent to the chest of a dog, wherein the first part is formed from a first continuous material; a second part configured to fit adjacent to the back of a dog, wherein the second part is formed from a second continuous material; a first adjustable strap configured to connect the first part and the second part; a second adjustable strap, distinct from the first adjustable strap, configured to connect the first part and the second part; and an aperture in the first continuous material or the second continuous material, the aperture leading to a compartment behind the first continuous material or the second continuous material, respectively, the compartment configured to receive and secure a GPS tracker therein.

In this way, the harness may be worn by a dog and a GPS tracker may be received and secured within the compartment. As the compartment is located behind the first continuous material or the second continuous material, a GPS tracker located within the compartment may be concealed from view, in use. Accordingly, if a dog is stolen while wearing the harness, the thief may be unaware of the presence and/or the location of the GPS tracker. This may enable the location of the dog to be ascertained by the owner so that the dog may be recovered. Furthermore, the unobtrusive and secure mounting of the GPS tracker within the GPS tracker holder may prevent it from becoming detached from the harness and lost. This may be especially useful when the harness is subjected to excessive movement and/or collisions, which may be common for the typical dog.

In an example, the size and/or shape of the harness may be altered to fit another animal, such as a cat, rabbit or pig.

The first part may be substantially Y shape, the two arms of the Y configured to fit adjacent to the shoulders of a dog, and the stem of the Y configured to extend down the chest and between the front legs of a dog. The second part may be substantially T shape, the two arms of the T configured to fit behind the front legs of a dog, and the stem of the T configured to extend up the back towards the back of the neck of a dog.

The first continuous material and/or the second continuous material may comprise polyester, nylon, cotton, neoprene, elastane, textile, leather, synthetic leather and/or plastics. The first continuous material and/or the second continuous material may comprise a water repellant coating, to aid in keeping the harness dry in wet weather. The first continuous material and/or the second continuous material may be air permeable, to facilitate breathability of the material of the harness when worn by a dog, in use.

The first adjustable strap and the second adjustable strap may comprise webbing, polyester, nylon, cotton, neoprene, elastane and/or plastics. The connection between the first part and the second part via the first adjustable strap and the second adjustable strap may be via clips, buckles, D-rings, hook and loop fastener and/or snap fasteners.

The first adjustable strap and the second adjustable strap may be adjustable in length, such that the distance between the first part and the second part may be varied. In this way, the harness may be adjusted according to the size of a dog wearing the harness.

The aperture may be a substantially linear opening in the first continuous material or the second continuous material. The compartment, the first continuous material and the second continuous material may be deformable, such that the aperture may be openable from a linear shape into a substantially elliptical shape, to facilitate insertion of a GPS tracker therein.

The compartment may be a pocket. The compartment may comprise polyester, nylon, cotton, neoprene, elastane, textile, leather, synthetic leather and/or plastics. The shape of the compartment may be configured to match the shape of a GPS tracker. For example, the compartment may be elliptical, square or rectangular. The size of the compartment may be marginally larger than the size of a GPS tracker, to facilitate insertion and removal of the GPS tracker therein. Alternatively, the size of the compartment may be marginally smaller than the size of a GPS tracker. In this way, insertion of a GPS tracker within the compartment may cause the material of the compartment to stretch, thereby accommodating a GPS tracker and also securing it within the compartment via elastic forces.

The largest width of the compartment may be between 5 mm and 150 mm, in particular between 30 mm and 100 mm, more particularly between 40 mm and 80 mm, for example approximately 60 mm or 70 mm. The largest depth of the compartment may be between 5 mm and 140 mm, in particular between 20 mm and 90 mm, more particularly between 40 mm and 70 mm, for example approximately 50 mm or 60 mm. When opened, the maximum height of the aperture and the compartment may be between 5 mm and 50 mm, in particular between 10 mm and 40 mm, more particularly between 15 mm and 35 mm, for example approximately 20 mm or 30 mm.

The harness may comprise one or more attachment points, to enable connection of a lead thereto. The attachment points may comprise loops of material and/or D-rings.

The GPS tracker holder may further comprise a GPS tracker arranged within the compartment.

The first part or the second part may comprise a linear seam, and a longitudinal axis of the aperture may be arranged substantially parallel to and adjacent to the linear seam.

The linear seam may be located at a border of the first continuous material or the second continuous material, where the first continuous material or the second continuous material joins an edge material. The linear seam may comprise stitches and/or adhesive. The longitudinal axis of the aperture may coincident with, or adjacent to, the border of the first continuous material or the second continuous material. In this way, the location of the aperture may be concealed from view, in that the aperture is aligned with the linear seam and does not cause any significant visual discontinuity in the first part or the second part.

The aperture may comprise a closing means.

The closing means may be configured to ensure the aperture remains closed when not in use, thereby aiding in the concealment of the GPS tracker within the compartment. The closing means may be located within the compartment, such that it is concealed from view.

The closing means may comprise at least one of a hook-and-loop fastener, a snap fastener, a magnet, a hook and eye fastener, a button, and a zip.

The GPS tracker holder may further comprise a handle, wherein the handle is arranged substantially adjacent to the compartment.

The handle may comprise a loop of material that extends outward from the first part or the second part. In this way, the handle may further obscure the location of the compartment. The handle may enable a user to hold onto to the harness when worn by a dog.

The GPS tracker holder may further comprise a locking means configured to prevent removal of the harness from a dog, in use.

The locking means may be configured to prevent disconnection of the first adjustable strap from the first part and the second part. Alternatively or additionally, the locking means may be configured to prevent disconnection of the second adjustable strap from the first part and the second part.

The GPS tracker holder may further comprise padding adjacent to the compartment.

The padding may be connected to the first part or the second part. The padding may comprise a pliable and/or resilient material. In this way the padding may increase the comfort of the harness, in use, by partially absorbing forces applied to the harness.

The padding may be substantially the same thickness as a GPS tracker. In this way, padding located adjacent to the compartment may cause the thickness of the first part or the second part of the harness to be equivalent to the thickness of the compartment with a GPS tracker situated therein. Accordingly, the padding may aid in visually concealing the location of the GPS tracker, in use.

In a second aspect, the invention provides a method of arranging a GPS tracker on a dog, the method comprising the steps of: providing the GPS tracker holder of any preceding claim; inserting a GPS tracker within the compartment; and arranging the harness on a dog.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

FIG. 1 is a top view of a GPS tracker holder, in the form of a dog harness.

DETAILED DESCRIPTION

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein. Likewise, method steps described or claimed in a particular sequence may be understood to operate in a different sequence.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any one embodiment or aspect of the invention may be combined in any suitable manner with any other particular feature, structure or characteristic of another embodiment or aspect of the invention, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances. The use of the term "any" may mean "all" and/or "each" in certain circumstances.

The principles of the invention will now be described by a detailed description of at least one drawing relating to exemplary features. It is clear that other arrangements can be configured according to the knowledge of persons skilled in the art without departing from the underlying concept or technical teaching, the invention being limited only by the terms of the appended claims.

FIG. 1 is a top view of a GPS tracker holder, in the form of a harness for a dog. If the harness were worn by a standing dog in the orientation shown, the head of the dog would be at the top of the page and the tail of the dog would be at the bottom of the page, with the dog's back facing out of the page.

The harness includes a first part 10 configured to fit adjacent to the chest of a dog, and a second part 20 configured to fit adjacent to the back of a dog. The first part 10 is connected to the second part 20 by four adjustable straps 30. The length of each strap 30 is adjustable via slides 40, which are slidable along each strap 30. When a slide 40 is slid along a strap 30, this varies the length of strap 30 that is doubled up on itself, thereby varying the length of the strap 30 between the first part 10 and the second part 20. In this way, the harness may be adjusted to fit dogs of varying proportions and sizes.

The harness includes three buckles 50 connected to the straps 30, to enable disconnection of the first part 10 from the second part 20, and consequently removal of the harness from a dog. The top left strap 30 does have a connected buckle 50, so that this strap remains permanently connected to the first part 10 and second part 20, to avoid the first part 10 and second part 20 becoming completely disconnected when not in use.

A D-ring 60 is attached adjacent to the centre of the second part 20. The D-ring 60 is suitable for attaching a lead to the harness.

An aperture 70 is located adjacent to the centre of the bottom edge of the second part 20. The aperture 70 is shown spaced from a seam 80 on the second part 20, for clarity. In an alternative arrangement, the aperture 70 may be aligned with the seam 80, to improve the visual concealment of the location of the aperture 70.

The aperture 70 leads to a compartment 90 behind the second part 20. A perimeter of the compartment 90 is shown in broken lines. The size and shape of the compartment 90 are configured to receive a GPS tracker therein. The aperture 70 includes a closing means 75. The closing means 75 may comprise at least one of a hook-and-loop fastener, a snap fastener, a magnet, a hook and eye fastener, a button, and a zip.

The invention claimed is:

1. A GPS tracker holder comprising:
   a harness for wearing by a dog, the harness comprising:
      a first part configured to fit adjacent to the chest of a dog, wherein the first part is formed from a first continuous material;
      a second part configured to fit adjacent to the back of a dog, wherein the second part is formed from a second continuous material, and wherein the first part or the second part comprises a seam located at a border of the first continuous material or the second continuous material, where the first continuous material or the second continuous material joins an edge material;
      a first adjustable strap configured to connect the first part and the second part;
      a second adjustable strap, distinct from the first adjustable strap, configured to connect the first part and the second part;
      an aperture in the first continuous material or the second continuous material, the aperture leading to a compartment behind the first continuous material or the second continuous material, respectively, such that the compartment is located between a dog and the first continuous material or the second continuous material, respectively, when in use, wherein the compartment is configured to receive and secure a GPS tracker therein, and wherein a longitudinal axis of the aperture is coincident with the border of the first continuous material or the second continuous material;
      a handle, wherein the handle is arranged substantially adjacent to the compartment; and
      padding adjacent to the compartment, wherein the padding has a thickness substantially the same as the GPS tracker secured in the compartment.

2. The GPS tracker holder of claim 1, further comprising a GPS tracker arranged within the compartment.

3. The GPS tracker holder of claim 1, wherein the aperture comprises a closing means.

4. The GPS tracker holder of claim 3, wherein the closing means comprises at least one of a hook-and-loop fastener, a snap fastener, a magnet, a hook and eye fastener, a button, and a zip.

5. The GPS tracker holder of claim 1, further comprising a locking means configured to prevent removal of the harness from a dog when in use.

6. A method of arranging a GPS tracker on a dog, the method comprising the steps of:
   providing the GPS tracker holder of claim 1;
   inserting a GPS tracker within the compartment; and
   arranging the harness on a dog.

\* \* \* \* \*